(12) United States Patent
Suenaga et al.

(10) Patent No.: US 7,097,926 B2
(45) Date of Patent: Aug. 29, 2006

(54) SOLID POLYMER ELECTROLYTE MEMBRANE AND FUEL CELL COMPRISING SAME

(75) Inventors: Toshihiko Suenaga, Saitama-ken (JP); Nobuaki Kimura, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/983,518

(22) Filed: Oct. 24, 2001

(65) Prior Publication Data

US 2002/0081476 A1    Jun. 27, 2002

(30) Foreign Application Priority Data

Oct. 24, 2000    (JP) .............................. 2000-324478

(51) Int. Cl.
*H01M 8/10*    (2006.01)
*H01M 2/00*    (2006.01)

(52) U.S. Cl. .......................................... 429/33; 429/34

(58) Field of Classification Search .................. 429/30, 429/35, 44, 36
See application file for complete search history.

(56) References Cited

U.S. PATENT DOCUMENTS 6,159,628 A * 12/2000 Grasso et al. ................. 429/35
6,517,962 B1 * 2/2003 Knights et al. ................ 429/13
6,531,236 B1 * 3/2003 Hatoh et al. .................. 429/34
2002/0034670 A1 * 3/2002 Suenaga et al.

FOREIGN PATENT DOCUMENTS

| JP | 10-50332 | 2/1998 |
| JP | 10-154521 A * | 6/1998 |
| JP | 11-204122 | 7/1999 |

OTHER PUBLICATIONS

JPO Machine Translation for JP 11-204122 A (Jul. 1999).*
The IPDL JPO Machine Translation for JP 10-154521 A (publication date of Jun. 1998).*

* cited by examiner

*Primary Examiner*—Dah-Wei Yuan
*Assistant Examiner*—Helen Chu
(74) *Attorney, Agent, or Firm*—Arent Fox PLLC

(57) ABSTRACT

A solid polymer electrolyte membrane comprising a base film and a moisture-proof layer. The moisture-proof layer may be disposed on an outer edge portion of the base film. The solid polymer electrolyte membrane according to an embodiment of the present invention is for use in a fuel cell, and comprises the base film having an electricity-generating region and a non-electricity-generating region, and the moisture-proof layer disposed on at least a part of the non-electricity-generating region. A fuel cell using the solid polymer electrolyte membrane is also provided.

17 Claims, 4 Drawing Sheets

SOLID POLYMER ELECTROLYTE MEMBRANE AND FUEL CELL COMPRISING SAME

BACKGROUND OF THE INVENTION

The present invention relates to a solid polymer electrolyte membrane usable for a solid polymer electrolyte fuel cell (PEFC), particularly to a solid polymer electrolyte membrane that is excellent in sealing properties to be capable of preventing leakage of a fuel gas (hydrogen gas), an oxidant gas (air), a humidification water and a coolant in a fuel cell. The present invention also relates to a fuel cell comprising the solid polymer electrolyte membrane.

In general, a fuel cell is provided by stacking a plurality of fuel cell units, a separator being disposed between the fuel cell units. Each of the fuel cell units comprises a solid polymer electrolyte membrane, an anode disposed on one surface of the membrane, and a cathode disposed on another surface of the membrane. More specifically, such a stacked-type fuel cell comprises: a carbon separator with electron-transporting properties having passages for independently introducing a fuel gas, an oxidant gas and a coolant to each fuel cell unit; a carbon fiber diffusion layer that diffuses the fuel gas or the oxidant gas and comes into contact with a convex part of the carbon separator to transfer electrons between an electrode and the carbon separator; an anode where the fuel gas is subjected to a chemical reaction to provide protons and electrons; a cathode where water is generated from oxygen, protons and electrons; and an electrolyte membrane in a wet state for transporting protons.

The fuel gas and the oxidant gas are used for the fuel cell as reaction gases, the fuel gas is supplied through an anode side passage of the separator, and the oxidant gas Is supplied through a cathode side passage of the separator. When each fuel cell unit is supplied with the reaction gases, the electrochemical reaction proceeds to generate electrons and the electrons are utilized in an external circuit as an electric energy.

The fuel gas, the oxidant gas and the coolant should be independently supplied to the fuel cell unit through different passages, therefore, it is important to seal the passages. Sealing method can be selected from various methods depending on the structure of the stacked fuel cell units. For example, a sealant may be disposed: around a communicating aperture going through the fuel cell stack for supplying the fuel gas, the oxidant gas, the humidification water and the coolant to each fuel cell unit; on the periphery of MEA (the electrolyte membrane+the electrodes+the diffusion layer); on the periphery of the passage where the coolant is supplied along surfaces of the separator to cool the separator; on the periphery of the separator; etc.

Known as the sealing method are: (i) methods where the fuel cell units and a frame having a sheet-shape, an O-shape, etc. are stacked while pressing, the frame being made of an elastic material such as an organic rubber (a fluoro-rubber, a silicone rubber, ethylene-propylene rubber, etc.) and an adhesive If hardening type-liquid material, thereby utilizing repulsive force of the elastic material to seal the fuel cell; (ii) methods where the fuel cell is compressed and sealed by an inorganic sheet such as a fiber sheet of graphite, ceramic, etc.; (iii) methods using a caulking or a mechanical sealant; etc.

Though a material for the sealant and a shape of the sealant should be selected in accordance with strength, surface state, etc. of the separator or MEA, the sealant is preferably miniaturized in the case of equipping an automobile with the fuel cell. In particular, each fuel cell unit of the fuel cell has to be thinned, thus, MEA and the separator have to be thinned. The separator, with which the sealant directly comes into contact, is generally made of a brittle material such as carbon, etc., so that the thinned separator is often broken when it is stacked with the fuel cell units. Thus, among the above methods of (i), (ii) and (iii), preferred are the methods of (i) using the sealant having proper elasticity and repellency.

However, when the fuel cell units and the separator are sufficiently sealed while pressing such that the separator is not broken, surface states such as a crease, a swell, a fold, a bend, a roughness, etc. of the MEA, particularly the electrolyte membrane coming into contact with the sealant, is remarkably affecting the sealing properties.

The electrolyte membrane in MEA is disadvantageous in that it abruptly expands or shrinks correspondingly to moisture content of air. The portion of MEA that comes in contact with the sealant is composed of only the electrolyte membrane without the electrodes and the diffusion layer, and the electrolyte membrane is often creased by the sealant. Thus, it is difficult to secure sufficient sealing properties even if the material and structure of the sealant are properly selected. Further, strict humidity control is required to assemble the MEA into the fuel cell without creasing the electrolyte membrane, thus, the conventional sealed fuel cells are poor in productivity.

OBJECT AND SUMMARY OF THE INVENTION

An object of the present invention is to provide a solid polymer electrolyte membrane, which is easily handled without strict humidity control, and which provides sufficient gas-sealing properties with a separator in a fuel cell. Another object of the present invention is to provide a fuel cell comprising the solid polymer electrolyte membrane.

As a result of intense research in view of the above objects, the inventor has found that a solid polymer electrolyte membrane comprising a particular moisture-proof layer does not abruptly expand or shrink correspondingly to moisture content of air, can be handled with ease, and does not affect electricity-generating properties of a fuel cell. The present invention has been accomplished by the finding.

Thus, the solid polymer electrolyte membrane of the present invention comprises a base film and a moisture-proof layer disposed thereon. The moisture-proof layer may be disposed on an outer edge portion of the base film.

The solid polymer electrolyte membrane of the present invention may be used in a fuel cell. In this case, the solid polymer electrolyte membrane comprises the base film and the moisture-proof layer, the base film has an electricity-generating region and a non-electricity-generating region, and the moisture-proof layer is disposed on at least a part of the non-electricity-generating region. The electricity-generating region of the base film is sandwiched between an anode and a cathode of the fuel cell. The non-electricity-generating region is such a region on which power generation is not carried out, and is generally an outer edge portion of the base film. Thus, in the solid polymer electrolyte membrane of the present invention, the moisture-proof layer is disposed on the non-electricity-generating region to prevent the solid polymer electrolyte membrane from expanding, shrinkage and creasing owing to moisture in air. As a result, a sealing surface of the solid polymer electrolyte membrane is improved with respect to smoothness, whereby the solid polymer electrolyte membrane is excellent in sealing properties.

The solid polymer electrolyte membrane of the present invention may be entirely made of a solid polymer. In this case, differences of expanding characteristics and shrinking characteristics are remarkably slight between the electricity-generating region and the non-electricity-generating region, whereby stress is hardly generated in the solid polymer electrolyte membrane. Further, mechanical strength of the solid polymer electrolyte membrane is improved by the moisture-proof layer. The solid polymer electrolyte membrane is hardly broken even if it is exposed out of the electrodes and the diffusion layer, whereby it hardly protrudes over the communicating aperture. When the solid polymer electrolyte membrane of the present invention is used in a fuel cell, it is preferable that the non-electricity-generating region is sandwiched between a couple of sealing frames and that the moisture-proof layer is disposed between the non-electricity-generating region and the sealing frames.

In the solid polymer electrolyte membrane of the present invention, it is preferred that the base film is made of perfluorinated sulfonic acid polymer and the moisture-proof layer is made of a fluororesin. The moisture-proof layer is preferably formed by applying a cold-setting type moisture-proof material to the base film. A method for forming the moisture-proof layer is preferably selected from the group consisting of coating methods, spray methods, dipping methods and printing methods.

A fuel cell of the present invention comprises a plurality of fuel cell units stacked with each other and a separator disposed between the fuel cell units, each of the fuel cell units comprising an anode, a cathode and the solid polymer electrolyte membrane of the present invention disposed between the anode and the cathode.

DETAILED DESCRIPTION OF THE PREFERRED EMBODIMENTS

Figure 1A:
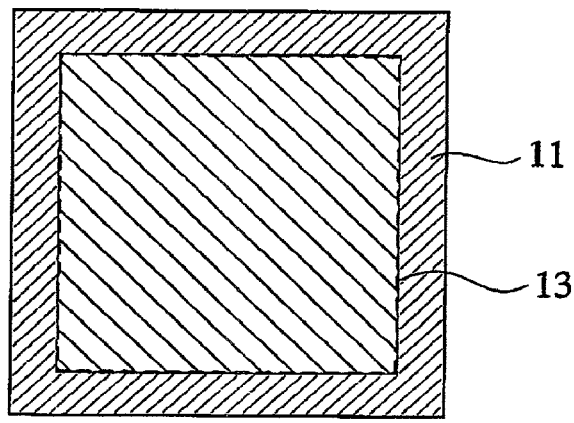
FIGS. 1(a), 1(b) and 1(c) are a schematic, top view showing an example of a solid polymer electrolyte membrane according to the present invention, respectively.

A solid polymer electrolyte membrane of the present invention comprises a base film and a moisture-proof layer disposed on at least a part of the base film. The moisture-proof layer may be disposed on an outer edge portion of the base film.

The solid polymer electrolyte membrane of the present invention may be used in a fuel cell. In this case, the solid polymer electrolyte membrane comprises the base film and the moisture-proof layer, the base film has an electricity-generating region and a non-electricity-generating region, and the moisture-proof layer is disposed on at least a part of the non-electricity-generating region. The electricity-generating region is sandwiched between an anode and a cathode of the fuel cell, thereby being such a region where a cell reaction is carried out. The non-electricity-generating region is not sandwiched between the anode and the cathode, and thereon is not carried out power generation. The solid polymer electrolyte membrane of the present invention comprises the moisture-proof layer to more effectively sealing the fuel cell without decreasing electricity-generating ability of the fuel cell.

Material used for the base film is not particularly limited if only it has conductivity to protons and electrons generated by an electrochemical reaction. The base film may be made of a polymer such as a fluorine-containing polymer, a hydrocarbon polymer, a polymer impregnated with phosphoric acid, etc. The base film is preferably made of an electro-conductive polymer of perfluorinated sulfonic acid such as "Nafion 117" from the viewpoint of thinning the solid polymer electrolyte membrane. The thickness of the base film is preferably 10 to 80 µm, more preferably 15 to 50 µm.

The moisture-proof layer is made of a moisture-proof material, which is not particularly limited and may be known material. From the viewpoint of adhesion between the base film and the moisture-proof layer, it is preferred that the moisture-proof layer is mainly made of the moisture-proof material similar to the material used for the base film, thus, it is preferable that the materials each used for the moisture-proof layer and the base film has high compatibility. For example, in the case where the base film is made of perfluorinated sulfonic acid polymer, it is preferable that the moisture-proof material is composed of a fluororesin. Further, a component that can increase adhesive properties between the moisture-proof layer and the following sealing frame is preferably added to the moisture-proof material, The moisture-proof material is preferably such a cold-setting type moisture-proof material that can be hardened without heating. The moisture-proof material may be dissolved in an organic solvent, water, etc. The moisture-proof material may be a heat-setting type moisture-proof material if the material can be hardened at a temperature, deterioration of the base film being not caused by the effect of the temperature.

In this invention, the moisture-proof layer of the moisture-proof material is formed on at least a part of the solid polymer electrolyte membrane to prevent the membrane from moisture absorption. Thickness of the moisture-proof layer is preferably 1 to 30 µm, particularly preferably 3 to 10 µm Though the moisture-proof layer may be disposed on only one side of the base film, it is preferred on the both sides of the base film is disposed the moisture-proof layers.

A fuel cell of the present invention comprises a plurality of fuel cell units stacked with each other and a separator disposed between the fuel cell units. Each of the fuel cell units comprises an anode and a cathode, and the above-mentioned solid polymer electrolyte membrane of the present invention disposed therebetween. In the fuel cell of the present invention, though the moisture-proof layer is disposed on any position of the base film, the non-electricity-generating region is generally located on an outer edge portion of the base film, whereby the moisture-proof layer is disposed on the outer edge portion. It is preferable that the non-electricity-generating region is sandwiched between a couple of sealing frames and the moisture-proof layer is disposed between the non-electricity-generating region and the sealing frames.

Figure 1B:
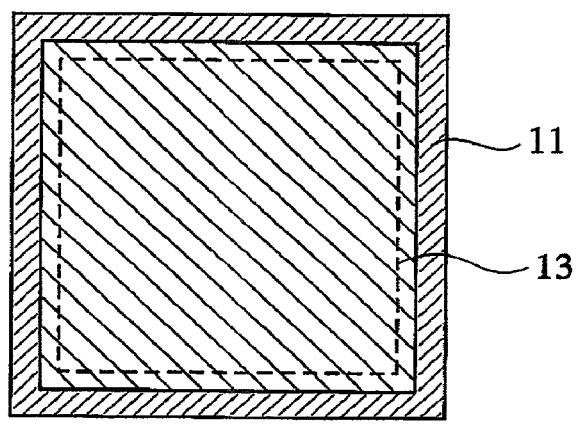
Figure 1C:
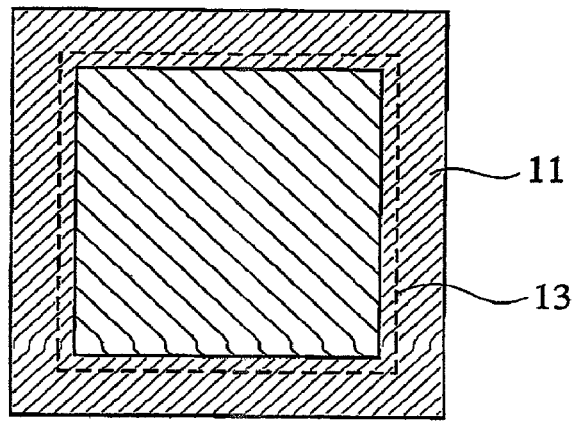

FIGS. 1(a), 1(b) and 1(c) are a schematic, top view showing an example of a solid polymer electrolyte membrane according to the present invention, respectively. In the solid polymer electrolyte membrane shown in FIG. 1(a), the non-electricity-generating region is located on the outer edge portion of the square base film, and the moisture-proof layer 11 is disposed on the entire non-electricity-generating region. On the electricity-generating region 13 shown with a dotted line is located the anode and the cathode. The non-electricity-generating region is not required to be entirely covered with the moisture-proof layer, and the non-electricity-generating region may be partially exposed. For example, in the solid polymer electrolyte membrane shown in FIG. 1(b), the non-electricity-generating region comprises: an end part where the moisture-proof layer is disposed; and a middle part that is not subjected to a treatment with the moisture-proof material. Further, as shown in FIG. 1(c), the electricity-generating region may be partly covered with the moisture-proof layer if the layer does not act to decrease the electricity generating properties of the fuel cell.

Although each of the solid polymer electrolyte membranes shown in FIGS. 1(a), 1(b) and 1(c) is in shape of a square, the shape of the solid polymer electrolyte membrane is not limited. In the case where a communicating aperture goes through the fuel cell stack for supplying the fuel gas, etc. to each fuel cell unit, the solid polymer electrolyte membrane may have an opening correspondingly to the communicating aperture. Further, the position, on which the moisture-proof layer is disposed, is also not limited to the outer edge portion of the base film. For example, in the case where the opening corresponding to the communicating aperture is disposed on a portion other than the outer edge portion, the moisture-proof layer may be disposed around the opening.

Figure 2:
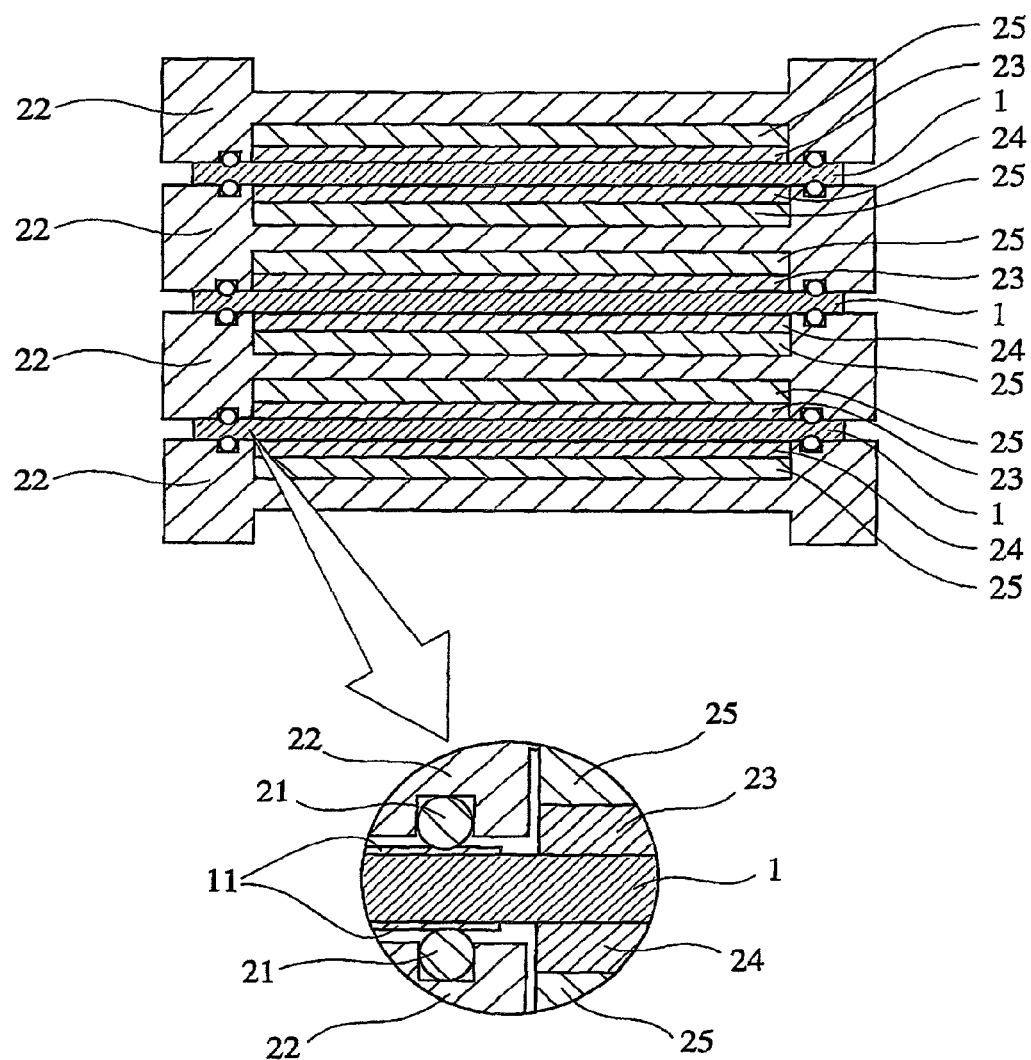
FIG. 2 is a schematic, cross-sectional view showing an example of a fuel cell according to the present invention where solid polymer electrolyte membranes of the present invention are assembled with separators.

FIG. 2 is a schematic, cross-sectional view showing an example of a fuel cell according to the present invention where solid polymer electrolyte membranes 1 of the present invention are assembled with separators 22. In this invention, the outer edge portion of the solid polymer electrolyte membrane 1 is preferably sandwiched and pressed by the separators 22 to increase the sealing properties, thereby preventing gases from being mixed. On one side of the electricity-generating region of the solid polymer electrolyte membrane 1 is disposed the anode 23 and on another side thereof is disposed the cathode 24. Further, a carbon fiber diffusion layer 25 is disposed on each of the anode 23 and the cathode 24 to diffuse the fuel gas or the oxidant gas. In the fuel cell shown in FIG. 2, the sealing frames 21 are disposed on the outer edge portion of each separator 22. To obtain a sufficient gas-sealing properties, it is preferable that the non-electricity-generating region of the solid polymer electrolyte membrane 1 is sandwiched between a couple of sealing frames 21 and the moisture-proof layer 11 is disposed between the non-electricity-generating region and the sealing frames 21.

Figure 3A:
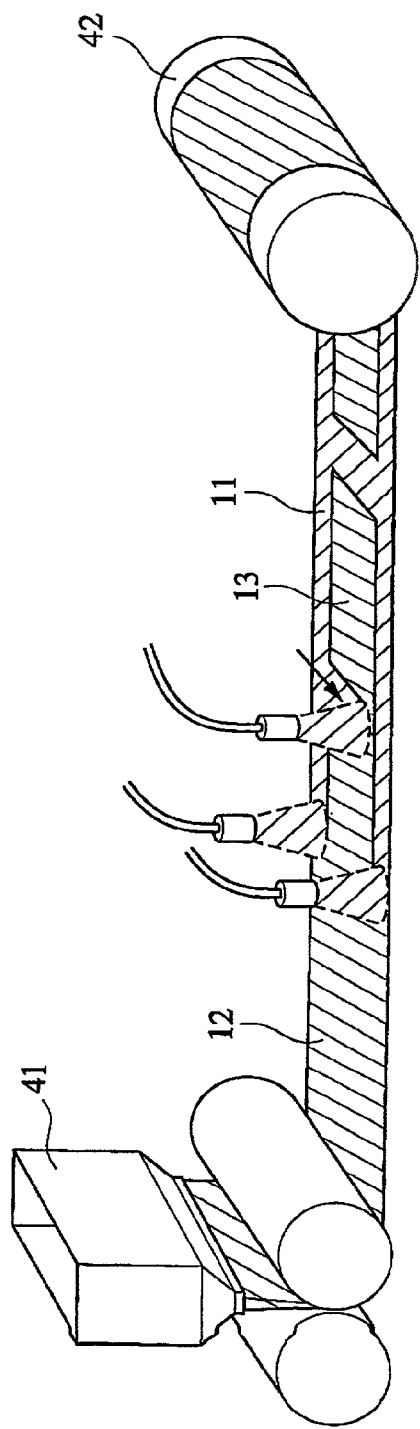
FIGS. 3(a) and 3(b) are schematic views showing production of a solid polymer electrolyte membrane of the present invention.
Figure 3B:
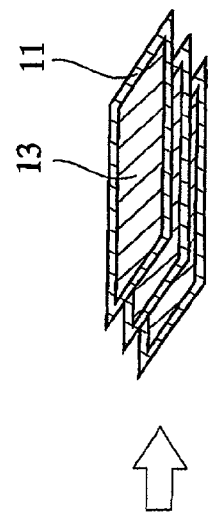
Figure 3B:
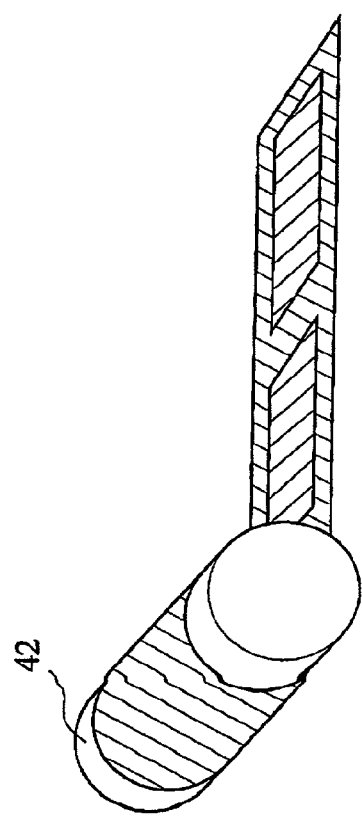

A method for producing the solid polymer electrolyte membrane of the present invention is not particularly limited. An example of producing the solid polymer electrolyte membrane will be described referring to FIGS. 3(a) and 3(b) below.

First, a resin in a melted state is extruded from a die 41 so that the base film 12 is formed by extrusion molding. Then, the moisture-proof material is sprayed on the non-electricity-generating region of the base film 12 and hardened to provide the moisture-proof layer 11. Although the moisture-proof material is sprayed while moving a spraying apparatus to prevent the moisture-proof material from adhering to the electricity-generating region 13 in FIG. 3(a), the moisture-proof material may be sprayed on the entire base film 12 while masking the electricity-generating region 13 with an iron plate or while taping the electricity-generating region 13. A method for forming the moisture-proof layer is not particularly limited and may be a known method. The method is preferably selected from the group consisting of coating methods, spray methods, dipping methods and printing methods. After forming the moisture-proof layer 11, the resultant membrane is taken up or winded by a take-up roller 42. In the case of using a heat-setting type moisture-proof material, the membrane is made to pass through an oven, etc. before taking-up. In the case where a sufficient period of time is required to harden the moisture-proof material, distance between the spraying apparatus and the take-up roller 42 may be increased. Then, the resulting membrane is subjected to punching or cutting, to produce the solid polymer electrolyte membrane having a desired shape.

EXAMPLES

The present invention will be explained in further detail by the following examples without intention of restricting the scope of the present invention defined by the claims attached hereto.

A moisture-proof material shown in Table 1 was applied to an outer edge portion of a base film under conditions shown in Table 2 to form a moisture-proof layer, whereby solid polymer electrolyte membranes of Examples 1 to 4 were produced, respectively. The base film was made of a perfluorinated sulfonic acid polymer represented by the following formula, and had a thickness of 50 μm and a size of 50 mm×50 mm. Further, a solid polymer electrolyte membrane of Comparative Example 1, where the moisture-proof layer was not disposed, was produced. Incidentally, because a heat resistance temperature of the base film was lower than recommended hardening temperatures (140° C. and 200° C.) of the moisture-proof materials used in Examples 3 and 4, the moisture-proof materials were heat-hardened at a temperature of 100° C., at which the base film was not deteriorated, in Examples 3 and 4.

TABLE 1

Properties and Composition of Moisture-Proof Material

| | Recommended Hardening Condition | Resin | Solvent |
|---|---|---|---|
| Ex. 1 | Room Temperature | Fluororesin | Perfluorocarbon |
| Ex. 2 | Room Temperature | Fluororesin | Butyl Acetate |
| Ex. 3 | 140° C. × 30 minutes | Fluororesin | n-Heptane, Toluene and Isooctane |
| Ex. 4 | 200° C. × 30 minutes | Fluororesin and Urethane Resin | Methylethylketone and Toluene |

TABLE 2

Conditions for Forming Moisture-Proof Layer

| | Applying Method | Applying Amount (Solid State) | Drying and Hardening Conditions |
|---|---|---|---|
| Ex. 1 | Brushing of Two Times at Interval of 5 minutes | 10 g/m$^2$ | Room Temperature × 1 hour |
| Ex. 2 | Brushing of Two Times at Interval of 5 minutes | 10 g/m$^2$ | Room Temperature × 1 hour |
| Ex. 3 | Spraying of 3 Round Trips | 5.5 g/m$^2$ | 100° C. × 1 hour |
| Ex. 4 | Spraying of 3 Round Trips | 6 g/m$^2$ | 100° C. × 1 hour |

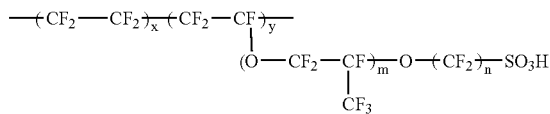

Figure 4:
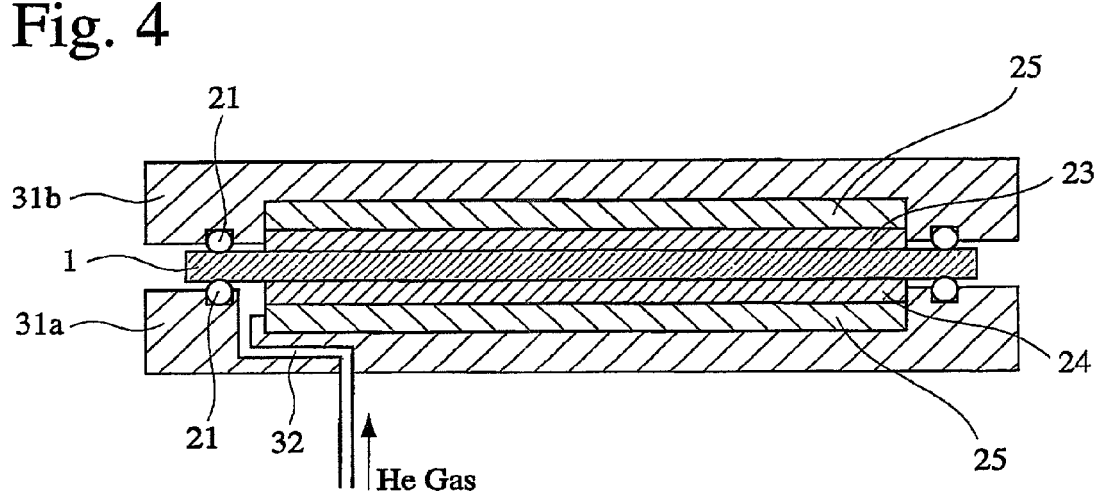
FIG. 4 is a schematic, cross-sectional view showing an apparatus used for a sealing properties test in EXAMPLES.

Each of the solid polymer electrolyte membranes was subjected to a moisture resistance test, and after heating them at 90° C. for 200 hours, each membrane was subjected to a sealing properties test. Results of the moisture resistance test and the sealing properties test were shown in Tables 3 and 4, respectively. Incidentally, the sealing properties test was carried out by an apparatus shown in FIG. 4 as follows: a stack of an anode 23, a cathode 24, a carbon fiber diffusion layers 25 and a solid polymer electrolyte membrane 1 was assembled with sealing frames 21 and jigs 31a and 31b corresponding to a separator; the resultant assemble was soaked in water and applied a pressure by He gas through a connector and a tube (not shown) disposed on an aperture 32 of the jig 31a; and gas leakage was evaluated by observing bubbles generated between the jigs 31a and 31b and by a flow meter disposed on the pressure-applying line.

membrane of Example 4 was hardly improved as compared with the solid polymer electrolyte membrane of Comparative Example 1, this was because the moisture-proof material was not sufficiently hardened at 100° C. lower than the recommended temperature of 200° C.

As shown in Table 4, in the solid polymer electrolyte membrane of Comparative Example 1, a sealing pressure caused the occurrence of gas leakage. As compared with this, the solid polymer electrolyte membranes of Examples 1 to 4 had a sufficient sealing properties for the sealing pressure.

As described in detail above, a solid polymer electrolyte membrane of the present invention comprises a moisture-proof layer to be excellent in moisture resistance and sealing properties. The solid polymer electrolyte membrane is remarkably useful for a fuel cell stack.

What is claimed is:

1. A solid polymer electrolyte membrane for use in a fuel cell comprising a base film and a moisture-proof layer adhered only to a sealing frame, and to an outer edge portion of said base film and to a part of a non-electricity-generating region of said base film so as to prevent said solid polymer electrolyte membrane from expanding, shrinking, and creasing owing to moisture in air, wherein an electricity-generating region of said film is sandwiched between an anode and a cathode of the fuel cell, wherein said non-electricity-generating region of said base film is not sandwiched between the anode and the cathode, and said moisture-proof layer is not disposed on any part of the electricity-generating region of said base film, and wherein said non-electricity-generating region is sandwiched between a pair of said sealing frames, said moisture-proof layer being disposed between said non-electricity-generating region and each of said sealing frames.

2. The solid polymer electrolyte membrane according to claim 1, wherein said base film is made of a perfluorinated sulfonic acid polymer and said moisture-proof layer is made of a fluororesin.

TABLE 3

Results of Moisture Resistance rest

| | Surface of Applied Moisture-Proof Material | | Surface of Solid Polymer Electrolyte Membrane | | | |
|---|---|---|---|---|---|---|
| | | | After 1 hour at 30° C., 90% RH | | After 1 hour at 90° C., 90% RH | |
| | Immediately After Applying | After Hardening | Visual Observation | Dimension | Visual Observation | Dimension |
| Ex. 1 | No Swell | No Swell, Slightly Extended | Slightly Wrinkled | a: +2% b: 0% | Slightly Wrinkled | a: +2% b: 0% |
| Ex. 2 | No Swell | No Swell, Slightly Extended | Slightly Wrinkled | a: +4% b: 0% | Slightly Wrinkled | a: +4% b: 0% |
| Ex. 3 | — | Slightly Swelled | Slightly Swelled | a: +1% b: +1% | Slightly Swelled | a: +1% b: +1% |
| Ex. 4 | — | Slightly Swelled | Extremely Wrinkled | a: +1% b: 0% | Extremely Wrinkled | a: +4% b: +6% |
| Comp. Ex. 1 | — | — | Extremely Wrinkled | a: +4% b: −4% | Extremely Wrinkled | a: +10% b: −4% |

The term "Swelled" means that the moisture-proof material or the solid polymer electrolyte membrane was entirely shape-changed with deflection.
The term "Wrinkled" means that the solid polymer electrolyte membrane was finely shape-changed, not entirely.
a: Vertical direction to drawing direction
b: Drawing direction

TABLE 4

Results of Sealing Properties Test

| | Gas Leakage |
|---|---|
| Ex. 1 | Not Observed at 200 kPa |
| Ex. 2 | Not Observed at 200 kPa |
| Ex. 3 | Not Observed at 200 kPa |
| Ex. 4 | Observed at 150 kPa |
| Comp. Ex. 1 | Observed at 100 kPa |

As shown in Table 3, the solid polymer electrolyte membranes of Examples 1 to 3 were improved with respect to the moisture resistance as compared with the solid polymer electrolyte membrane of Comparative Example 1. Although the moisture resistance of the solid polymer electrolyte 3. The solid polymer electrolyte membrane according to claim 1, wherein said moisture-proof layer is formed by applying a cold-setting type moisture-proof material to said base film.

4. The solid polymer electrolyte membrane according to claim 1, wherein said moisture-proof layer is formed by a method selected from the group consisting of coating methods, spray methods, dipping methods and printing methods.

5. A solid polymer electrolyte membrane for use in a fuel cell, wherein said solid polymer electrolyte membrane comprises a base film having an electricity-generating region and a non-electricity-generating region, and a moisture-proof layer adhered only to a sealing frame, and to said base film and to a part of said non-electricity-generating region so as to prevent said solid polymer electrolyte membrane from expanding, shrinking, and creasing owing to moisture in air,
 wherein said electricity-generating region is sandwiched between an anode and a cathode of the fuel cell, and wherein said moisture-proof layer is not sandwiched between the anode and the cathode, said moisture-proof layer is not disposed on any part of the electricity-generating region of said base film, and
 wherein said non-electricity-generating region is sandwiched between a pair of sealing frames, said moisture-proof layer being disposed between said non-electricity-generating region and each of said sealing frames.

6. The solid polymer electrolyte membrane according to claim 5, wherein said base film is made of a perfluorinated sulfonic acid polymer and said moisture-proof layer is made of a fluororesin.

7. The solid polymer electrolyte membrane according to claim 5, wherein said moisture-proof layer is formed by applying a cold-setting type moisture-proof material to said base film.

8. The solid polymer electrolyte membrane according to claim 5, wherein said moisture-proof layer is formed by a method selected from the group consisting of coating methods, spray methods, dipping methods and printing methods.

9. A fuel cell comprising a plurality of fuel cell units stacked with each other and a separator disposed between said fuel cell units, wherein each of said fuel cell units comprises an anode, a cathode and the solid polymer electrolyte membrane recited in claim 1 or 5 disposed between said anode and said cathode.

10. A solid polymer electrolyte membrane for use in a fuel cell, wherein said solid polymer electrolyte membrane comprises a base film and a moisture-proof layer adhered only to a sealing frame, and to an outer edge portion of said base film so as to prevent said solid electrolyte membrane from expanding, shrinking, and creasing owing to moisture in air,
 said base film comprising an electricity-generating region sandwiched between an anode and a cathode of the fuel cell and a non-electricity-generating region not sandwiched between the anode and the cathode,
 wherein said moisture-proof layer is disposed on at least a part of said non-electricity-generating region and not on any part of said electricity-generating region, and
 wherein said non-electricity-generating region is sandwiched between a pair of said sealing frames, said moisture-proof layer being disposed between said non-electricity-generating region and each of said sealing frames.

11. The solid polymer electrolyte membrane according to claim 10, wherein said base film is made of a perfluorinated sulfonic acid polymer and said moisture-proof layer is made of a fluororesin.

12. The solid polymer electrolyte membrane according to claim 10, wherein said moisture-proof layer is formed by applying a cold-setting type moisture-proof material to said base film.

13. The solid polymer electrolyte membrane according to claim 10, wherein said moisture-proof layer is formed by a method selected from the group consisting of coating methods, spray methods, dipping methods and printing methods.

14. A fuel cell comprising a plurality of fuel cell units stacked with each other and a separator disposed between said fuel cell units, wherein each of said fuel cell units comprises an anode, a cathode and the solid polymer electrolyte membrane recited in claim 10 disposed between said anode and said cathode.

15. The solid electrolyte membrane according to claim 1, wherein said sealing frame is disposed on the periphery of an MEA, which includes the electrolyte membrane, the anode, the cathode, and a diffusion layer.

16. The solid electrolyte membrane according to claim 1, wherein said sealing frame is made of an elastic material.

17. The solid polymer electrolyte membrane according to claim 16, wherein said sealing frame has on O-shape.

* * * * *